United States Patent [19]
Ginns Haskell

[11] 3,797,305

[45] Mar. 19, 1974

[54] SELF CALIBRATING STRAIN GAGE TORQUEMETER

[75] Inventor: Ginns Haskell, Belmont, Mass.

[73] Assignee: The Indikon Company, Inc., Watertown, Mass.

[22] Filed: Jan. 31, 1972

[21] Appl. No.: 222,267

[52] U.S. Cl. .................... 73/136 A, 73/1 R, 73/1 C
[51] Int. Cl. ............................................. G01l 3/10
[58] Field of Search .......... 73/136 A, 1 R, 1 B, 1 C; 324/130

[56] References Cited
UNITED STATES PATENTS

| | | | |
|---|---|---|---|
| 3,134,279 | 5/1964 | Sims et al. | 73/136 A X |
| 3,519,969 | 7/1970 | Hoffman | 73/136 A X |
| 2,602,839 | 7/1952 | Ellis | 73/1 R UX |
| 3,130,578 | 4/1964 | Ames, Jr. | 73/1 R X |
| 3,399,398 | 8/1968 | Becker et al. | 324/DIG. 1 |
| 3,439,258 | 4/1969 | Van Leeuwen | 324/74 X |
| 3,450,978 | 6/1969 | Norman | 324/DIG. 1 |

*Primary Examiner*—Charles A. Ruehl

[57] ABSTRACT

A torquemeter for sensing the torque transmitted by a rotatable shaft and adapted to compensate for measurement errors such as those resulting from variations in coupling between instrumentation on the rotatable shaft and torque indicating electronics or variations in the shaft mounted instrumentation. Torque sensing instrumentation on the rotatable shaft provides a torque signal representative of actual shaft torque and periodically interrupts the torque signal to provide a reference signal representative of a known, calibration torque. The torque and reference signals are both coupled from the shaft to the external torque indicating electronics where they are logically processed to provide an indication of the torque in the shaft, compensated for variations that do not represent torque.

12 Claims, 3 Drawing Figures

PATENTED MAR 19 1974　　　　　　　　　　　　　　　3,797,305

SELF CALIBRATING STRAIN GAGE TORQUEMETER

FIELD OF THE INVENTION

This invention relates to torquemeters and in particular to self calibrating systems for indicating shaft torques.

BACKGROUND OF THE INVENTION

There is a substantial market for instrumentation to determine the horsepower transmitted by a rotating shaft, for example a shaft connecting electrical power generators with their power sources. Horsepower is physically the product of shaft torque and shaft rotation speed. Shaft rotation speed is easily determined, but shaft torque is difficult and awkward to measure accurately.

Torque in a rotating shaft has previously been determined by securing a four element strain gage bridge to the rotating shaft to sense shaft strain along orthogonal surface angles, each being inclined 45 degrees to the axis of shaft rotation. Operating power for the strain gage bridge and the bridge unbalance signal resulting from shaft torque have in the past been transmitted to and from the shaft through either slip rings or rotary transformers. Slip rings have proved satisfactory because of their rapid wear-out and high noise figures. Short life times are particularly disadvantageous in applications involving large, remote installations like pumping or power generation where it is desirable for the system to run continuously for many months. The rotary transformer, by eliminating direct electrical conduction between the shaft and external instrumentation, has the potential to eliminate the problem of wear-out and contact noise, but rotary transformers have a further substantial defect in that, if used without bearings, their coupling efficiency changes significantly over time due to shaft looseness, misalignment or to thermal effects. If used with bearings to hold the primary and secondary coils of the transformer in precise relationship, the bearings themselves reduce running times between maintenance and increase system cost and size. Examples of this latter technique are shown by U.S. Pat. Nos. 3,519,969 and 3,531,748 using multiple rotary transformers.

SUMMARY OF THE INVENTION

In accordance with the present invention, a shaft torque measuring system is provided wherein unwanted variations such as those resulting from changes in coupling efficiency between the rotating shaft and external instrumentation is electronically compensated to provide a greatly more accurate indication of shaft torque.

In a preferred embodiment of the invention, a single rotary transformer is employed for coupling power to a rotating shaft and returning torque indicating signals to external electronics. The rotary transformer is designed for long life and to have a minimum variation in coupling, but the assumption is made that there will be some coupling variation, particularly over time. In order to eliminate the effect of this variation, a rugged solid state electronic compensation system is affixed to the rotating shaft. The shaft mounted electronics is operative to provide an excitation signal to a strain gage bridge cemented to the shaft and to detect bridge unbalance indicative of shaft torque. The bridge unbalance signal is further coupled to external instrumentation through the rotary transformer.

Operating power for the shaft mounted electronics is applied through the rotary transformer. The shaft mounted electronics responds to first and second characteristics in the power signal to switch between first and second states. In the first state, the shaft mounted electronics operates normally to provide a bridge unbalance signal directly indicative of shaft torque. In the second state, a bias is provided to the strain gage bridge which causes the bridge unbalance signal to act as a reference signal representing a predetermined shaft torque. Both the normal bridge unbalance and reference signals are coupled through the same rotary transformer and are similarly affected by changes in the coupling of the transformer. The normal unbalance and reference signals received by the external electronics are sampled and logically processed, and using the known torque represented by the reference signal the normal unbalance signal is compensated for variations in rotary transformer coupling.

BRIEF DESCRIPTION OF THE DRAWINGS

These and other features of the present invention will be more fully understood by reference to the below detailed description of a preferred embodiment presented for purposes of illustration and not by way of limitation, and to the accompanying drawings of which.

DETAILED DESCRIPTION OF A PREFERRED EMBODIMENT

Figure 1:
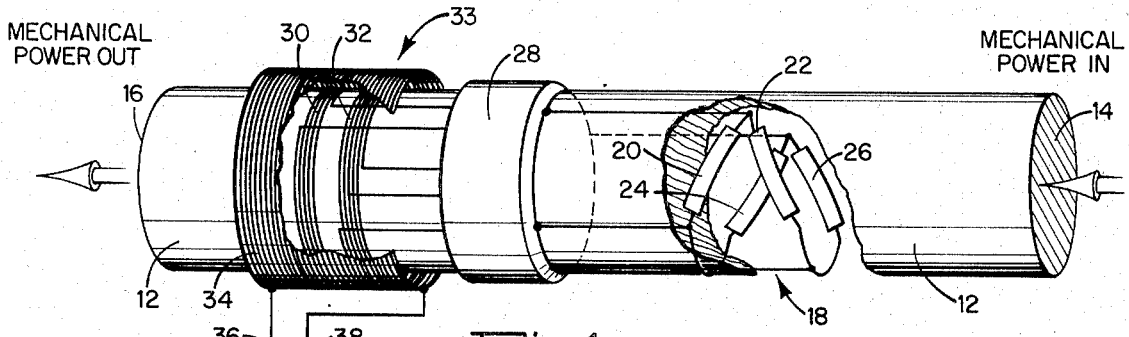
FIG. 1 pictorially illustrates a power transmitting shaft with electronics and a strain gage bridge mounted thereto and further having a rotary transformer coupling signals to and from the shaft.

Referring now to FIG. 1, there is shown a shaft 12 transmitting mechanical power from a power input 14 to a power output 16. In order to measure shaft torque and ultimately transmitted horsepower, a strain gage bridge 18 is mounted to the shaft and comprises strain gage elements 20, 22, 24 and 26 angled at 45° to the axis of rotation. Each node of the bridge 18 is connected to an electronics system 28 also affixed to the shaft 12 and comprising solid state circuitry ruggedized and incapsulated in accordance with techniques known in the art to withstand the effects of shaft rotation. The electronic system 28 is also connected with first and second windings 30 and 32 respectively of a single rotary transformer 33 affixed to the shaft 12. The windings 30 and 32 rotate within a winding 34 which is fixed and has terminals 36 and 38 connected to external circuitry as will be indicated in FIG. 2.

Figure 2:
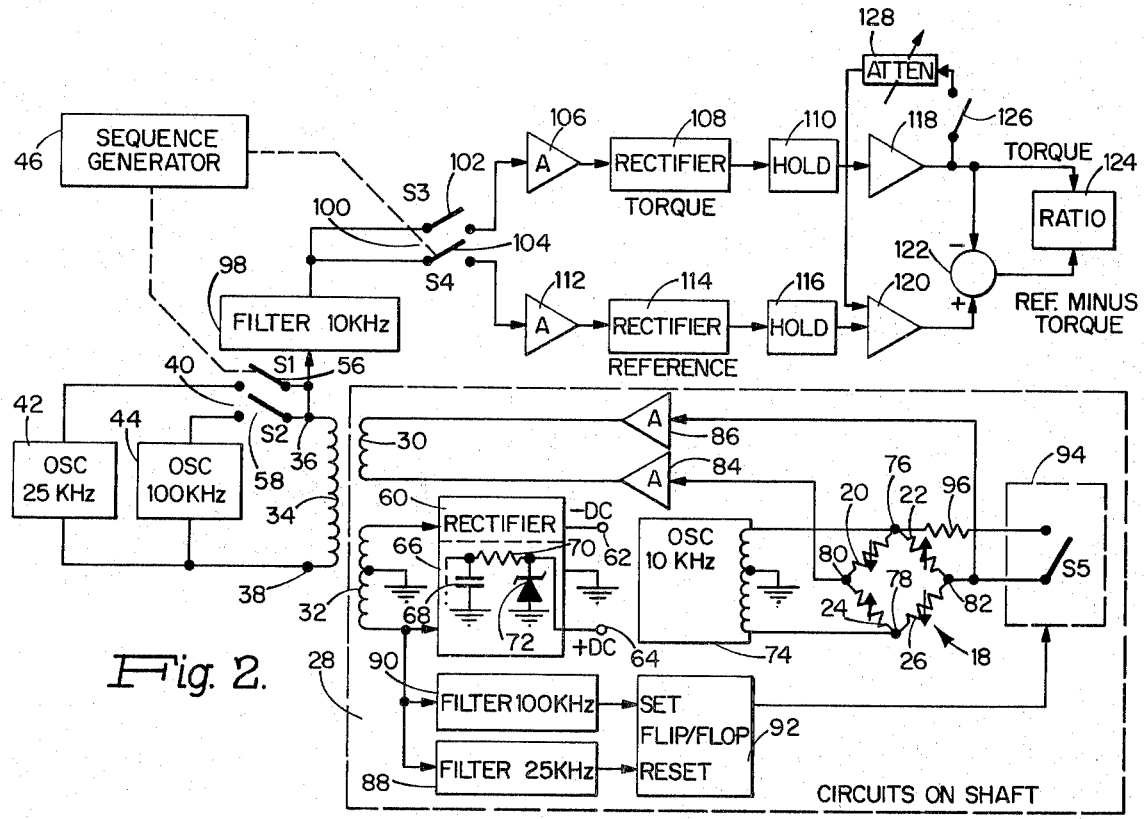
FIG. 2 indicates in block and partial schematic diagrams circuitry according to the invention for providing compensation for changes in coupling of the rotary transformer.
Figure 3:
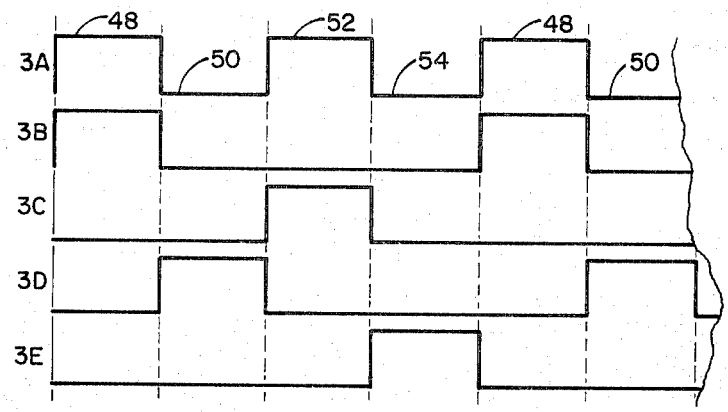
FIG. 3 contains waveform diagrams useful in explaining the operation of the invention.

Now with reference to FIG. 2, the coil 34 is excited at its terminals 36 and 38 by signals alternately applied through a switch 40 from a 25 KHz oscillator 42 and a 100 KHz oscillator 44. The switch 40 is controlled by a sequence generator 46 which defines a repeating cycle of four time intervals 48, 50, 52 and 54 as indicated in FIG. 3A. During the interval 48, FIG. 3B, a first set of contacts 56 in the switch 40 are closed to apply the signal from oscillator 42 to the coil 34. As indicated in FIG. 3C, a second set of contacts 58 in the switch 40 are closed during the interval 52 to provide signals from the oscillator 44 to the coil 34. In the intervening time periods 50 and 54 no excitation is applied to coil 34 from either oscillator 42 or 44.

The 25 KHz and 100 KHz signals applied to the coil 34 of the rotary transformer 33 are coupled to the coil 32 on the shaft 12. The coil 32 applies the electrical oscillations to a rectifier circuit 60 which provides operating power for the electronic system 28 mounted on the shaft 12 through terminals 62 and 64. Specific interconnections between the circuitry and supply terminals 62 and 64 are not indicated but are to be understood to exist. The rectifier 60 has a filter portion 66 which, as in known filters, not only removes the ripple from the rectifier signal but provides sufficient signal storage and level control to maintain the DC level output at the terminals 62 and 64 in the intervals 50 and 54 between the periods 48 and 52 when power is applied through the coils 34 and 32 to the rectifier 60. In providing this continuous DC power, the filter portion 66 may include a filter capacitor 68, series resistance 70 and diode regulator 72.

Continuous DC power from the rectifier 60 energizes a 10 KHz oscillator 74 which applies electrical oscillations to opposite nodes 76 and 78 on the strain gage bridge 18. The other pair of opposite nodes 80 and 82 are connected through amplifiers 84 and 86 respectively to opposite terminals of the coil 30 to apply the bridge unbalance signal through the rotary transformer to the external coil 34.

Also within the electronic system 28 on the shaft 12 are 25 KHz and 100 KHz filters 88 and 90 which respectively select or respond to the 25 KHz and 100 KHz signals from the coil 32 to reset and set a flip-flop circuit 92. The filters 88 and 90 may be AC coupled to the flip-flop circuit 92. AC gain may be provided if necessary for the particular components employed.

A binary output of the flip-flop 92 is applied to an electronic switch 94 which, for convenience in FIG. 2, is indicated as a mechanical switch. The switch 94 responds to one of the binary outputs to close its contacts during the intervals 52 and 54 which in turn connects a resistor 96 in parallel across the resistive strain gage element 22 in the bridge 18. Thus the signal applied to the coil 32 alternates between a normal unbalance signal from the bridge 18 during intervals 48 and 50 and a reference signal during intervals 52 and 54. The reference signal has an amplitude determined by the shunting resistance 96 as well as the actual shaft torque and represents a predetermined shaft torque added to the actual shaft torque.

Both the normal unbalance and reference signals are coupled by the coil 30 to the coil 34 where they may be sensed accurately during the intervals 50 and 54 between the periods 48 and 52 when 25 KHz and 100 KHz power is applied to the coil 34 through switch 40. The unbalance and reference signals on the coil 34 are applied through a 10 KHz filter 98 to first and second sets of contacts 102 and 104 of a switch 100 which is controlled by the sequence generator 46. During the interval 50, as indicated by the control signal of FIG. 3D, the switch contacts 102 are closed by the sequence generator 46 to pass the normal unbalance signal to an amplifier 106 and, in series, to a rectifier 108 and sample and hold circuit 110. During the interval 54, as indicated in FIG. 3E, the contacts 104 are closed by the sequence generator 46 to apply the reference signal serially through an amplifier 112, rectifier 114, and sample and hold circuit 116. It can be appreciated that the sample and hold circuits 110 and 116 will have at their outputs signals respectively representative of the normal unbalance signal from the bridge 18 and the reference signal provided by the closure of the contacts in the switch 94.

By appropriate selection of the value of the resistor 96 in relation to the normal resistances of the elements 20 through 26 in the strain gage bridge 18 it is possible to cause the reference signal to have a value which is a large multiple, typically ten, of the full scale unbalance signal from the bridge 18 in addition to a component equal to the actual unbalance signal. The reference signal thus represents a large known torque plus actual shaft torque. Mathematically, the output at the terminals 80 and 82 of the bridge 18 when the contacts of switch 94 are open is given by the equation:

$$V_o = V_i \, \Delta R_s/R \text{ for small R} \tag{1}$$

Where:
$V_i$ is the signal across points 76 and 78;
R is the unstressed resistance of elements 20–26; and $\Delta R$ is the simultaneous resistance change in all elements, adjacent elements in the bridge changing in opposite directions. The output of the bridge with the switch 94 closed is approximately given by:

$$V_o' \approx [(V_o - (V_i R/4 \ R')] (1 - a + a^2 \ldots) \tag{2}$$

Where:
$R'$ is the value of resistor 96;
$a = R/2R'$; and $$\Delta R/R \text{ (full scale)} = 0.002$$

From equations (1) and (2) it can be appreciated that the output of the bridge in the calibrator reference mode will be composed of a term depending only on the bridge unbalance due to torque ($V_o$), a term depending only on the calibration resistance 96 (($-V_i R/4R'$) ($1-a+a^2 \ldots$)) and a term depending on both (($V_o$)($-a + a^2 \ldots$)).

In a typical case where $R'$ is about 12 times R($a = 1/24$) the error introduced by this last term can, for many applications, be neglected as contributing less than one-half percent to the reference signal. Under these circumstances, the torque and reference signals respectively held in the sample and hold circuits 110 and 116, are applied through buffer amplifiers 118 and 120 to inverting and noninverting inputs of a difference amplifier 122. The output of the amplifier 118 and the output of the difference amplifier 122 are then applied to numerator and denominator inputs respectively of a ratio voltmeter 124. Since the signal in the sample and hold circuit 116 is substantially equal to the signal in the sample and hold circuit 110 plus ten times the full scale output for the bridge 18, the ratio voltmeter 124 will receive at its respective inputs a signal indicative of shaft torque and a signal indicative of a large predetermined torque. The ratio output of voltmeter 124 will thus represent actual shaft torque compensated for coupling errors in transformer 33. The voltmeter 124 can be adjusted by a scale factor to read directly in terms of the shaft torque.

As indicated above, the coupling between the coils 30, 32 and 34 of the rotary transformer 33 can vary due to shaft misalignment, thermal expansion, temperature effects on coil resistances and other factors so as to introduce a random variation into the normal unbalance and the reference signals at the output of the filter 98. The effects of transformer coupling, however, are of sufficiently slow variation compared to sampling rates which can be 100 times per second that the coupling can be made to appear constant over many cycles from the sequence generator 46. This causes both of the normal bridge unbalance and reference signals to be affected identically by the same coupling error, and their ratio indicated by the output of meter 124 is free of this error.

It has been assumed that the term $(V_o)(-a + a^2 \ldots)$ can be neglected for reasonably accurate results under the conditions indicated. It is possible, however, that conditions may require that this term be accounted for such as in the case of semiconductor strain gage elements having a substantially greater full scale variation. Then the reference signal would have a component equal to a percentage of actual bridge torque. To compensate for this additional component, summing amplifier 122 can have an adjusted gain for the input from amplifier 118 different from the gain for the input from amplifier 120. Alternatively the output from amplifier 118 can be applied through a switch 126 and attenuator 128 to a further input of amplifier 120.

The reference signal produced by this system to represent a known torque for automatic error compensation in the torque unbalance signal is inherently stable by depending upon resistance properties of resistor 96 which can be controlled as desired. In particular, resistor 96 can be chosen with a temperature coefficient (through the use of a thermistor) complementary to the temperature coefficient of the strain gage resistances 20–26 or to counterbalance temperature effects on shaft elastic properties and thus provide a further error compensation in the indication of torque provided by voltmeter 124. Moreover, variations in the shaft mounted electronics and the power applied thereto are automatically compensated.

The system as described above has operated to switch the shaft mounted electronics between modes of normal torque sensing and reference torque sensing through the application of alternate frequencies of power excitation to this rotating circuitry. It is possible to excite these different modes in several other ways as will be appreciated by those skilled in the art. Thus a sequence of pulses could be applied through the rotary transformer to effect system switching or a shaft mounted monostable or astable multivibrator might be adapted to provide mode switching in response to external pulses or not as desired. Additional modifications and alterations within the spirit of the invention will occur to those skilled in the art and accordingly it is intended to limit the scope of this invention only as indicated in the following claims.

What is claimed is:

1. Apparatus for providing an electrical signal representative of torque in a rotating shaft as derived from a shaft mounted torque sensor and providing compensation for signal variations resulting from other than torque changes, said apparatus comprising:

means for applying external electrical energy to said shaft;
   means for receiving said applied energy on said shaft;
   means responsive to said received energy for energizing said torque sensor whereby said torque sensor provides an output torque signal representative of shaft torque;
   means for periodically biasing said torque signal to provide an output reference signal in place of said output torque signal, said reference signal being representative of a predetermined shaft torque;
   means for coupling said torque and reference signals from said shaft to points external of said shafts;
   means responsive to said torque and reference signals coupled from said shaft for providing said electrical signal representative of shaft torque as the ratio of said torque and reference signals.

2. The apparatus for indicating torque of claim 1 wherein said means for periodically biasing said torque signal includes means for adjusting said reference signal by a predetermined percentage of said torque signal.

3. Apparatus for providing an output indication of torque in a rotating shaft in response to variations in a shaft mounted torque sensor and providing compensation for output variations resulting from other than torque changes, said apparatus comprising:

means for generating electrical excitation with distinct repeating characteristics thereto;
   means for coupling said excitation to said shaft;
   means secured to said shaft and responsive to said electrical excitation for energizing said torque sensor whereby said torque sensor provides an output torque signal representative of shaft torque;
   means responsive to distinct repeating characteristics of said excitation coupled to said shaft for alternately biasing said torque sensor to provide an output reference signal in place of said torque signal;
   means for coupling said torque and reference signals from said shaft; and
   means responsive to said torque and reference signals coupled from said shaft for providing said output indication of shaft torque compensated for said variations resulting from other than shaft torque.

4. The apparatus for indicating torque of claim 3 wherein said coupling means comprises a single rotary transformer.

5. The apparatus for indicating torque of claim 3 wherein:
   said torque sensor is a strain gage bridge;
   said biasing means is operative to shunt one of the strain gage elements of said bridge with a predetermined resistance; and
   said output indication providing means includes means for differencing said coupled torque and reference signals to provide a difference signal and for indicating the ratio of said torque signal coupled from said shaft to said difference signal.

6. Apparatus for indicating torque in a rotating shaft comprising a first electronic system mounted on said shaft and a second electronic system mounted external of said shaft with transformer electrical coupling means for coupling electrical signals between said first and second electronic systems, said coupling means being susceptible to variation in its coupling efficiency, said second electronic system comprising:

first generating means for generating electrical oscillations at a first frequency;

second generating means for generating electrical oscillations at a second, different frequency;

means for alternately applying said first and second frequency oscillations to said coupling means and providing intervening intervals when neither of said oscillations is coupled thereto;

said first electronic system comprising:

means for alternately receiving said first and second frequencies of electrical oscillations from said coupling means;

means operative to provide system operating power from said received oscillations during the intervening intervals between application of said first and second frequencies of electrical oscillations to said coupling means;

a torque sensor affixed to said shaft for sensing torque;

means responsive to said system operating power for energizing said torque sensor to provide a torque signal representative of shaft torque;

means for applying said torque signal to said coupling means;

means responsive to said alternately received first and second frequencies of electrical oscillations for alternately biasing said torque sensor to provide a reference signal representative of predetermined torque for application to said coupling means in place of said torque signal;

said second electronic circuit further having means for receiving said reference signal and said torque signal during said intervening intervals and operative to provide an output indication of shaft torque compensated for variations in said torque signal resulting from other than torque changes.

7. The apparatus for indicating torque of claim 6 wherein said coupling means is a unitary rotary transformer.

8. The apparatus for indicating torque of claim 6 wherein said means operative to provide an output indication of shaft torque includes means for differencing said received torque and reference signals to provide a difference signal more directly representative of said known torque and for indicating the ratio of the received torque signal to said difference signal.

9. The apparatus for indicating torque of claim 8 wherein:

said shaft torque sensor includes a four element strain gage bridge;

said energizing means includes an oscillator applying electrical excitation to opposite junction points on said bridge; and said biasing means is operative to periodically change the resistance of one or more of the elements of said bridge to cause the output of said bridge to change substantially more than the output produced by a full scale torque change in said bridge.

10. The apparatus for indicating torque of claim 6 wherein:

said shaft torque sensor includes a four element strain gage bridge;

said energizing means includes an oscillator applying electrical excitation to opposite junction points on said bridge; and said biasing means is operative to periodically change the resistance of one or more of the elements of said bridge to cause the output of said bridge to change substantially more than the output produced by a full scale torque change in said bridge.

11. Apparatus for measuring torque in a rotating shaft and for providing an output indication of said torque at a point external of said shaft including:

means for generating electrical oscillations with first and second characteristics;

a rotary transformer having a primary coil external of said shaft connected to receive said electrical oscillations and a secondary coil mounted to said shaft and oriented for inductively receiving said oscillations;

a filtered rectifier responsive to electrical oscillations from said secondary coil to provide operating power;

an oscillator responsive to said operating power for generating alternating electrical signals;

a strain gage bridge having a plurality of strain gage elements secured to said shaft to provide a variation in the resistance of said elements representative of said torque;

said alternating current output of said oscillator being applied to said strain gage bridge whereby said strain gage bridge has an electrical output representative of shaft torque;

means for applying the bridge output to said rotary transformer for coupling to the primary thereof;

means for sensing the first and second characteristics in said oscillations;

switch means having first and second states, said first state existing in response to detection of said first characteristic and said second state existing in response to detection of said second characteristic;

at least one resistive element having a resistance substantially higher than the resistance of the elements of said strain gage bridge and alternately connected in parallel with an element of said bridge during one of said first or second states of said switch means;

means for alternately directing said bridge output coupled to said primary coil along first and second paths respectively in synchronism with the first and second characteristics of said electrical oscillation and correspondingly the first and second states of said switch means;

said first path including means for sampling said bridge output to provide a first sample signal representative of shaft torque;

said second path including means for sampling said bridge output to provide a second sample signal representing said bridge output during intervals when said resistive element is connected in parallel with one of said strain gage elements;

means for differencing the first and second sample signals to provide an output difference signal more directly representative of said predetermined known shaft torque; and means for indicating the ratio of said first sample signal and said output difference signal to provide said output indication of actual shaft torque compensated for variations in said first sample signal resulting from other than torque changes.

12. The apparatus for measuring torque of claim 11 wherein:

said generating means includes first and second oscillators of first and second frequencies of oscillation alternately connected to the primary of said rotary transformer to provide said excitation with said first and second characteristics;

the connection of said first and second oscillators to the primary winding being separated by intervening intervals when neither of said electrical oscillators is connected to said primary winding; and further wherein said filtered rectifier means includes means for maintaining the operating power output thereof during said intervening intervals when no electrical excitation is received in the secondary winding of said rotary transformer.

* * * * *

UNITED STATES PATENT OFFICE
CERTIFICATE OF CORRECTION

Patent No. 3,797,305          Dated March 19, 1974

Inventor(s) Haskell Ginns

It is certified that error appears in the above-identified patent and that said Letters Patent are hereby corrected as shown below:

Page one, inventor's name should read --Haskell Ginns-- not "Ginns Haskell".

Column 1, line 26, "satisfactory" should read --unsatisfactory--.

Signed and sealed this 29th day of October 1974.

(SEAL)
Attest:

McCOY M. GIBSON JR.
Attesting Officer

C. MARSHALL DANN
Commissioner of Patents